(12) United States Patent
Corfitsen

(10) Patent No.: US 11,465,897 B2
(45) Date of Patent: Oct. 11, 2022

(54) METHOD AND DEVICE FOR AUTOMATIC REFUELLING OF VEHICLES

(71) Applicant: Sten Corfitsen, Stockholm (SE)

(72) Inventor: Sten Corfitsen, Stockholm (SE)

(*) Notice: Subject to any disclaimer, the term of this patent is extended or adjusted under 35 U.S.C. 154(b) by 0 days.

(21) Appl. No.: 16/884,488

(22) Filed: May 27, 2020

(65) Prior Publication Data
US 2020/0361761 A1 Nov. 19, 2020

Related U.S. Application Data

(63) Continuation of application No. 15/027,410, filed as application No. PCT/SE2014/051169 on Oct. 7, 2014, now abandoned.

(30) Foreign Application Priority Data

Oct. 7, 2013 (SE) .................................... 1351185-2

(51) Int. Cl.
| | |
|---|---|
| *B67D 7/04* | (2010.01) |
| *F16L 11/15* | (2006.01) |
| *F16L 11/20* | (2006.01) |
| *F16L 11/115* | (2006.01) |
| *F16L 11/12* | (2006.01) |

(52) U.S. Cl.
CPC ............ *B67D 7/0401* (2013.01); *F16L 11/15* (2013.01); *B67D 2007/0419* (2013.01); *B67D 2007/0474* (2013.01); *F16L 11/115* (2013.01); *F16L 11/12* (2013.01); *F16L 11/20* (2013.01)

(58) Field of Classification Search
CPC .......... B67D 7/0401; B67D 2007/0474; B67D 2007/0419; F16L 11/15; F16L 11/20; F16L 11/12; F16L 11/115

USPC ............................................................ 141/1
See application file for complete search history.

(56) References Cited

U.S. PATENT DOCUMENTS

| | | | | |
|---|---|---|---|---|
| 1,819,175 | A | * 8/1931 | James | B29D 23/18 138/122 |
| 3,172,428 | A | * 3/1965 | Tudge | F16L 11/12 138/172 |
| RE31,882 | E | * 5/1985 | Moskovich | B67D 7/54 141/311 R |
| 4,531,551 | A | * 7/1985 | Eichelberger | F16L 11/112 138/148 |

(Continued)

FOREIGN PATENT DOCUMENTS

EP 1983243 A1 * 10/2008 ............ F16L 11/115

*Primary Examiner* — Timothy L Maust
*Assistant Examiner* — James R Hakomaki
(74) *Attorney, Agent, or Firm* — Tucker Ellis LLP

(57) ABSTRACT

Provided is a device for automatic refueling of a vehicle that includes a nozzle having a flexible filler pipe with an open end. The filler pipe is inserted, with the open end first, into the tank pipe to deliver fuel through the open end into the tank pipe. An axial pressure is applied to the filler pipe to insert the filler pipe into the tank pipe. The filler pipe includes an inner fuel pipe of flexible hard plastic material, and an outer metal coil or a series of metal rings. The metal coil or metal rings are arranged to run in parallel to and outside of the inner fuel pipe. The metal coil is arranged to run in and along a recess in the surface of the inner fuel pipe and the metal rings are disposed in a series of annular recesses in the surface of the fuel pipe.

15 Claims, 4 Drawing Sheets

(56) References Cited

U.S. PATENT DOCUMENTS

| | | | | |
|---|---|---|---|---|
| 5,222,949 A * | 6/1993 | Kaldany | ................. | A61L 29/06 |
| | | | | 604/524 |
| 5,485,870 A * | 1/1996 | Kraik | ..................... | B21F 17/00 |
| | | | | 138/121 |
| 5,634,505 A * | 6/1997 | Wong | ..................... | B67D 7/005 |
| | | | | 137/614.05 |
| 5,638,875 A * | 6/1997 | Corfitsen | ............. | B67D 7/0401 |
| | | | | 141/231 |
| 5,671,786 A * | 9/1997 | Corfitsen | ............. | G07F 13/025 |
| | | | | 901/6 |
| 5,758,701 A * | 6/1998 | Corfitsen | ............... | B60K 15/04 |
| | | | | 141/382 |
| 5,829,495 A * | 11/1998 | Corfitsen | ............. | B67D 7/0401 |
| | | | | 141/348 |
| 6,003,568 A * | 12/1999 | Strnad, Jr. | ............... | B60K 15/04 |
| | | | | 123/519 |
| 6,269,848 B1 * | 8/2001 | Corfitsen | ............. | B67D 7/0401 |
| | | | | 141/94 |
| 6,354,343 B1 * | 3/2002 | Strnad | ................. | B67D 7/0401 |
| | | | | 141/94 |
| 6,761,192 B2 * | 7/2004 | Horvath | ................. | B60K 15/04 |
| | | | | 141/94 |
| 2008/0202620 A1 * | 8/2008 | Van Hooren | .... | F02M 35/10019 |
| | | | | 138/126 |

* cited by examiner

METHOD AND DEVICE FOR AUTOMATIC REFUELLING OF VEHICLES

RELATED APPLICATION DATA

This application is a continuation of U.S. patent application Ser. No. 15/027,410, filed Apr. 5, 2016, which is a National Stage filing of PCT/SE2014/051169 filed Oct. 7, 2014, which claims the benefit of Swedish Application No. 1351185-2, filed Oct. 7, 2013, the disclosures of which are incorporated herein by reference in their entireties.

BACKGROUND

The present invention relates to a method and an apparatus for automatic refueling of vehicles.

The Swedish patent with publication No SE509736 discloses a method for automatically filling liquid fuel to a vehicle, such as a car. The method comprises the car being positioned adjacent to a robot, which automatically positions itself in relation to the vehicle's fuel cap, opens the fuel cap and connects a nozzle to the car's tank pipe. Thereafter, fuel is filled into the tank pipe.

One problem with this method is to design a nozzle through which the liquid fuel can be supplied to the vehicle's fuel inlet in a reliable and efficient manner.

Conventionally, at manual petrol stations for vehicles a nozzle with a built-in overflow sensing functionality is used, which throttles the supply of fuel into the tank pipe when the fuel level rises above the orifice of the nozzle. Such systems are typically mechanical, and use a pressure-transmitting tube between the orifice and a pressure sensor disposed elsewhere. Such a device is described for example in U.S. Pat. No. 4,522,237.

It is essential both that the filling process proceeds as quickly as possible, to reduce waiting time, and that there is no risk of fuel spillage because of overfilling. Furthermore, any electrical potential differences between the vehicle and filling equipment must be equalized before the replenishment is started, to avoid spark formation in the vicinity of the fuel.

The present invention solves the above described problems.

SUMMARY

Thus, the invention relates to a nozzle for use in a device for automatic refueling of vehicles, which nozzle in turn comprises a connecting means and a flexible filler pipe with an open end, which filler pipe is arranged to, after the connecting means has been positioned in connection to an orifice of a tank pipe of the vehicle, be pressed, by an axial pressure applied to the filler pipe at a location spaced from the open end, with the open end first, into and down into the tank pipe and then to deliver the said fuel from a pump device, through the said open end and into the tank pipe, which nozzle is characterized in that the filler pipe comprises an inner fuel pipe of flexible hard plastic material, through which fuel pipe fuel, which is delivered into the tank pipe, can flow on its way from the pump device, and an outer metal coil or a series of metal rings, in that the metal coil or metal rings is or are arranged to run in parallel to and outside of the fuel pipe, and in that the metal coil or metal rings is or are arranged to run in and along a recess in the surface of the fuel tube.

The invention also relates to a method for automatic refueling of vehicles, whereby a nozzle, comprising a flexible filler pipe and a connecting means, in a first step automatically is positioned in connection to an orifice of a tank pipe of the vehicle, whereby the nozzle thereafter, in a second step, is connected to the tank pipe so that the filler pipe is brought through the said orifice and down a certain distance into the tank pipe, and thereby can fill a liquid fuel from a pump device, through an open end of the filler pipe and into the tank pipe, and whereby the fuel in a third step is filled into the tank pipe from the pump device, which method is characterised in that the filler pipe, which comprises firstly an inner fuel pipe of flexible hard plastic material, through which fuel pipe fuel delivered into the tank pipe can flow on its way from the pump device, and secondly an outer metal coil or a series of outer metal rings running in parallel to and outside of the fuel pipe and in and along a recess in the surface of the fuel tube, while being pressed into and down into the tank pipe, adjusts its shape to the inner shape of the tank pipe by bending of the filler pipe.

The invention will now be described in detail, with reference to exemplary embodiments of the invention and to the accompanying drawings, in which:

Figure 1:
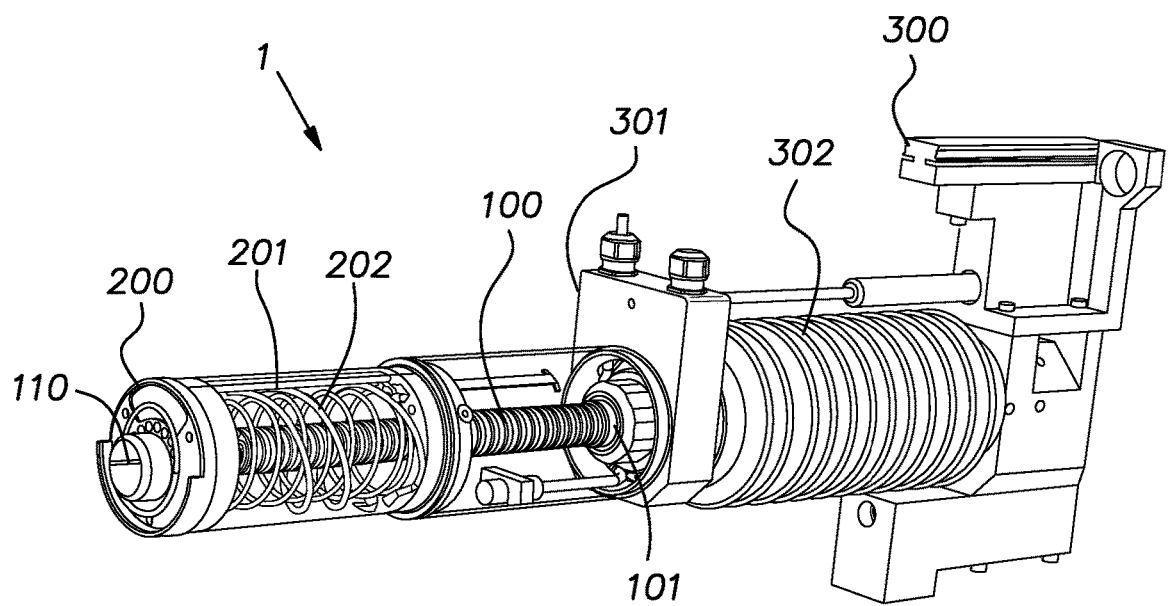
FIG. 1 is a schematic perspective view of a part of a device according to the present invention, including a nozzle according to the invention for automatic refueling of a vehicle, which device is suitable for use in a method according to the invention.

Reference numerals are shared for all the figures.

DETAILED DESCRIPTION

FIG. 1 illustrates a device 1 for the automatic refueling of a vehicle (not shown), comprising a nozzle according to the invention. The nozzle comprises, in turn, a connecting means 200 and a filler pipe 100. The connecting means 200 is arranged to be positioned adjacent to an orifice of a tank pipe of the vehicle, and to guide the filler pipe 100 when the latter is pressed into and down into the tank pipe.

The device also comprises a main body, a portion 300 of which is illustrated in FIG. 1. The main body further comprises a location means, arranged to bring the said nozzle to a position adjacent to an orifice of a tank pipe of the vehicle, as well as insertion means, arranged to press the filler pipe 100 of the nozzle, with its open end 110 first, past and preferably through the nozzle connecting means 200, through said orifice and into and down into the tank pipe. In addition, the device 1 main body comprises a filling device, arranged to supply liquid fuel through the filler pipe 100 and down into the vehicle's tank pipe.

A method according to the present invention for automatic refueling of a vehicle starts by the device 1 being connected to the vehicle. According to the invention, this connection is performed completely automatically. The method comprises at least the following steps:

1) The nozzle is automatically positioned in relation to an orifice of the vehicle's tank pipe. This means that the said position is first established by the location means, in a way which is conventional as such, such as by optical scanning in combination with electrically driven positioning means, and that the location means thereafter brings the main body 300 to the centre of the tank pipe orifice.

2) The location means brings the main body 300 to a position in which the nozzle is connected to the tank pipe, and preferably so that the connection means 200 abuts the vehicle adjacent to the tank pipe orifice, preferably so that the connection means 200 surrounds the tank pipe orifice.

3) The locating means brings the main body 300 further in a direction towards the vehicle, whereby a bellows 302 is compressed and a support 301, against which the filler tube 100 abuts, is brought towards the vehicle. As a consequence, a flexible tube 201, which encloses the filler pipe 100, is compressed, against the spring force of a spring means 202 that also encloses the filler pipe 100, and the filler pipe 100 is pushed forwards towards the vehicle and the said tank pipe orifice.

4) The motion towards the tank pipe orifice continues, whereby the filler pipe 100 is pressed or squeezed through the tank pipe orifice and down a certain distance into the tank pipe, so that a liquid fuel thereafter can be filled from a pump device in the main body, through the open end 110 of the filler pipe 100 and into the tank pipe.

5) The fuel is filled into the tank pipe from the pump device, via the filler pipe 100.

The filler pipe 100 is thus arranged to, after the connecting means 200 has been positioned adjacent to the tank pipe orifice, be pressed, by an axial pressure applied to the filling pipe 100 at a location 101 spaced from the open end 110, preferably at least 15 cm, more preferably at least 25 cm from the open end 110, preferably at an end of the filler pipe 100 opposite to the open end 110, with the open end 110 first, into and down into the tank pipe, and then to deliver the fuel through the filler pipe 100 and its open end 110, into the tank pipe.

Figure 2:
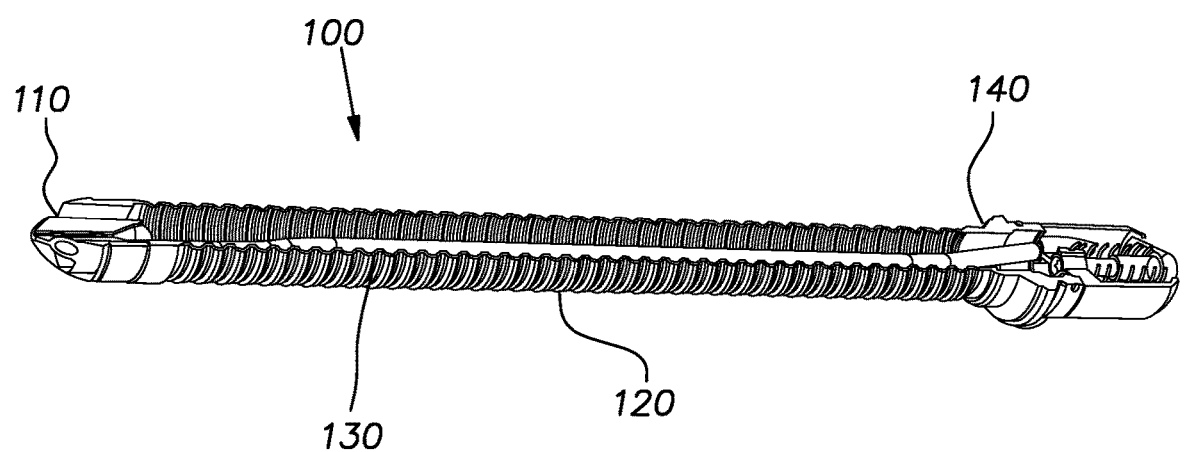
FIG. 2 shows, in perspective, a filler pipe according to the invention, wherein a cross-section has been removed.
Figure 3:
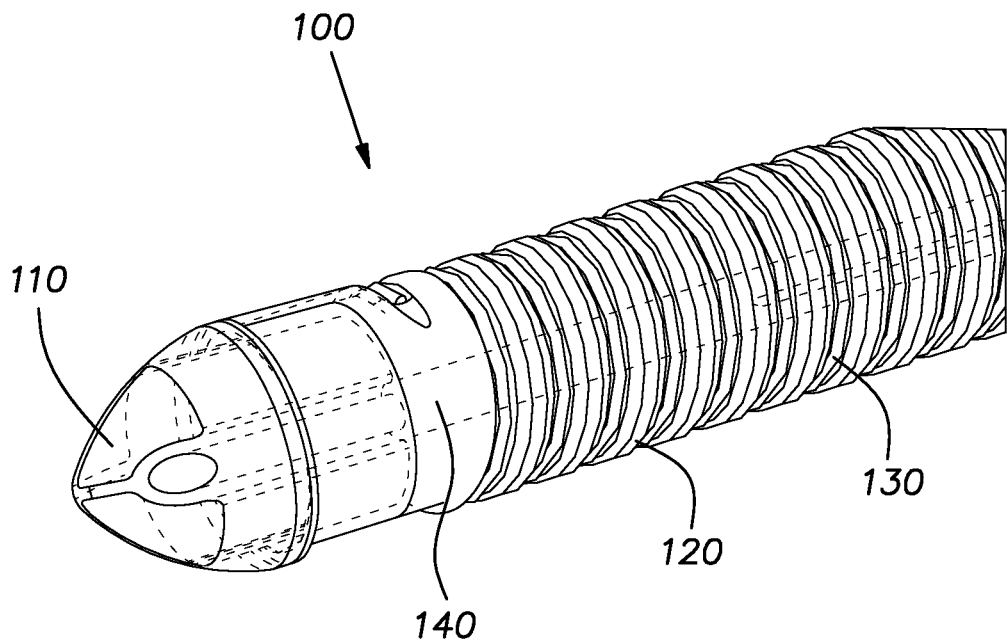
FIG. 3 is a detail perspective view of the filler pipe shown in FIG. 2.

FIG. 2 illustrates the filler pipe 100 in closer detail. A cross section has been removed in order to make visible the structure of the wall of the filler pipe 100, as well as its interior.

In order to be able to be pushed down into the tank pipe, which is normally curved, the filler pipe 100 is flexible, so that the filler pipe 100 while being pressed into and down into the tank pipe, by bending the filler pipe 100, adapts its shape to the interior of the tank pipe, which preferably has a curved shape.

According to the invention, the filler pipe 100 comprises, firstly, an inner fuel pipe 120 of flexible hard plastic material, through which fuel pipe 120 the fuel which is delivered into the tank pipe can flow on its way from the pump device. It is understood that an inner liner or the like can be used, so that the fuel does not come into direct contact with the inner surface of the fuel pipe 120, but it is preferred that the fuel pipe 120 is constructed as a homogeneous body of hard plastic material which comes into direct contact with the fuel which is advanced through the filler pipe 100.

Figure 6:
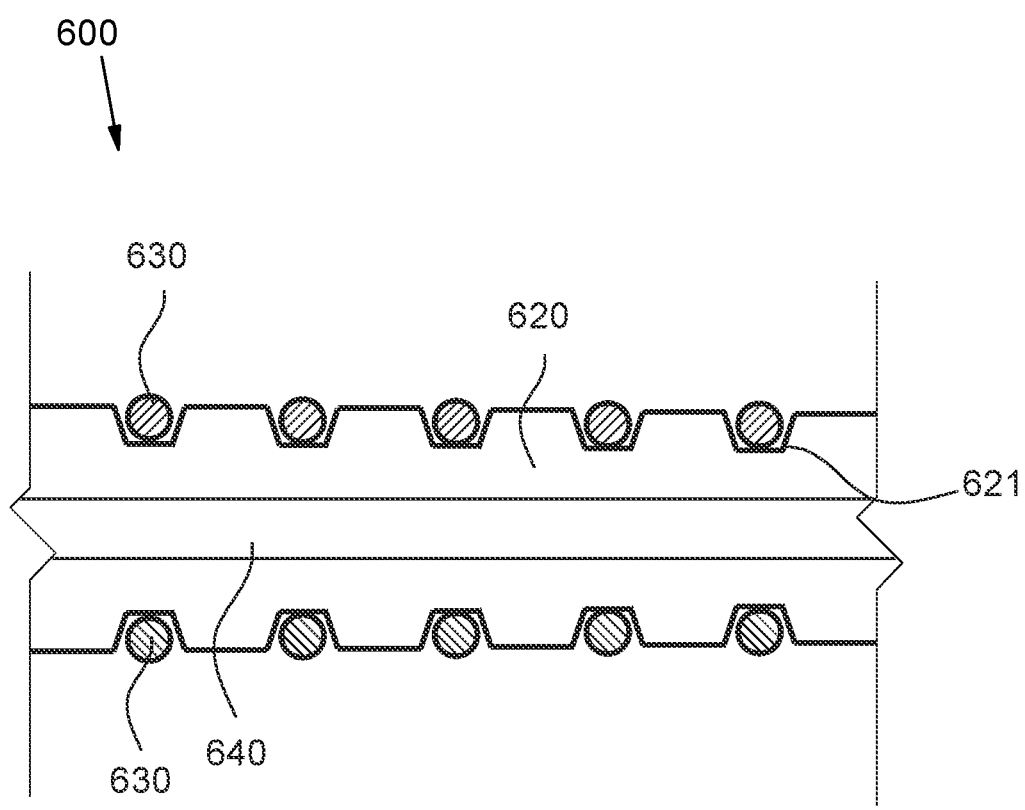
FIG. 6 is a cross sectional view illustrating an exemplary embodiment of a filler pipe.

Secondly, the filler pipe 100 has a metal outer coil 130 which runs in parallel to and outside of the fuel pipe 120 in and along a recess in the surface of the fuel pipe 120. An alternative embodiment (illustrated in FIG. 6) of a filler pipe 600 includes a series of closely spaced metal rings 630 that are distributed along the length of the fuel pipe 620, with their respective centre points aligned along an axis which is parallel with the longitudinal direction of the fuel pipe 620 and with their respective main planes in parallel with each other, and similarly running along a series of annular recesses 621 in the surface of the fuel pipe 620. In the following, only the term "metal coil" will be used, but it is understood that the corresponding description also applies in case a series of rings 630 is used instead of a coil 130.

Such construction, with an inner plastic pipe and an outer metal coil, countersunk in the plastic pipe, results in a number of advantages.

Firstly, a simple, reliable and cost effective design is achieved, wherein only relatively simple materials and manufacturing methods are used.

Secondly, adequate flexibility is easily achieved along with the main longitudinal direction of the filler pipe 100, in order for it to be pressed down into the tank pipe of most vehicles on the market, such as cars, buses, motorcycles and boats, without risking material damage or unacceptable wear.

Thirdly, a robust construction is achieved, since the metal coil can absorb the greater part of the applied loads at insertion and extraction of the filler pipe into and out from the tank pipe.

Fourthly, the externally arranged metal coil, which preferably is electrically connected to ground in the main body 300, results in that the inside of the tank pipe can be earthed safely and simply in connection to the insertion of the filler pipe 100 into the tank pipe and the resulting contact between the inner surface of the tank pipe and the outer surface of the metal coil 130, and as a consequence before the fuel is supplied to areas where there is a risk of spark formation.

Fifthly, the filler pipe 100 can be made sufficiently rigid in its axial direction to be pressed down into the tank pipe by use of a force which is applied at a distance from its open end 110, see below.

It is further preferred that the nozzle includes a channel 140, running along and inside of the fuel pipe 100, preferably running free inside of the fuel pipe 100, from the open end 110 to the opposite end and on to the pump device in the main body 300. Through the channel 140, a gas may be supplied from an opening at the open end 110 to the pump device. The pump device is further arranged to sense a fuel level in the tank pipe through said gas communication, in a known manner, by sensing a pressure change that occurs when the fuel surface exceeds the level of the opening of the channel 140, with the purpose of controlling the supply of fuel. The channel 140 is flexible, and comprises for this purpose a flexible tube, preferably manufactured in a flexible hard plastic material.

In order to be able to achieve as much as possible of the advantages of the flexible filler pipe 100 explained above, it is preferred that the above construction, namely the one where the metal coil 130 runs along with and in a manner countersunk in the fuel pipe 120, extends across a lengthwise section of filler pipe 100 of at least 15 cm, more preferably at least 25 cm, preferably across substantially the entire length of the filler pipe 100. Thus, in this case both the fuel pipe 120 and the metal coil 130 run along the same stretch of at least 15 cm, preferably at least 25 cm, along the filler pipe 100. The filler pipe 100 as such is preferably between 15 and 100 cm, more preferably between 25 and 100 cm, long.

It is further preferred that such sections of the filler pipe 100 can be bent to a curvature radius of as little as 0.5 m without being damaged, specifically without the fuel pipe 120 bursting.

The metal coil 130 can be made of stainless steel, spring steel or another metal that is resistant to the fuel used, and which is tough enough to withstand the stress during insertion and extraction of the filler pipe 100 into and out from the tank pipe.

The hard plastic material of the fuel pipe may, for instance, be a suitable fuel resistant and durable thermoplastic.

In a particularly preferred embodiment, said countersink in the fuel pipe 120 is spiral-shaped and arranged to follow the metal coil 130 along the fuel pipe 120. In other words, the metal coil is recessed in the fuel pipe 120, and is arranged to run along a trench formed in the surface of the fuel pipe 120. Such a construction provides a particularly good flexibility and strength of the structure, as the material of the fuel pipe 120 can be bent at said helical recess, and also contributes to that the metal coil 130 stays in place, without moving from its optimal position. As noted above, the same applies in the case a series of metal rings is used instead of a metal coil.

It is particularly preferred that the respective outer radii of the metal coil 130 and fuel pipe 120 are adapted to each other via the depth of the recess. Preferably, the depth of the recess is at least half the thread radius of the metal coil 130, so that half of the thread radius extends outside from the fuel pipe 120. Preferably, and as illustrated in the figures, the respective outer radius of the metal coil 130 and fuel pipe 130 are adapted so as to be substantially equal along a stretch of at least 15 cm, more preferably at least 25 cm, along the filler pipe 100, such as along the above stated length of at least 15 cm, more preferably at least 25 cm. This can for example be accomplished by the recess depth being substantially the same as the metal coil 130 wire radius. This is illustrated clearly in FIG. 4, wherein a helical recess is indicated at 121.

With such a preferred construction, the surface of the filler pipe 100 will be covered by a spiral pattern, or a pattern comprising a series of stacked rings, composed of helical ridges where every second raised portion is constituted by the metal coil 130 and every other is constituted by the surface of the fuel pipe 120, especially the ridges 122 (see FIG. 4) being formed in the intermediate space between two recesses 121. Such a surface is relatively smooth upon contact with the metal of the inside of the tank pipe, and therefore causes the filler pipe 100 to be able to simply slide down into the tank pipe, but nevertheless displays, despite this and because of the element of metal in its surface, high resistance to abrasion and impacts.

Figure 4:
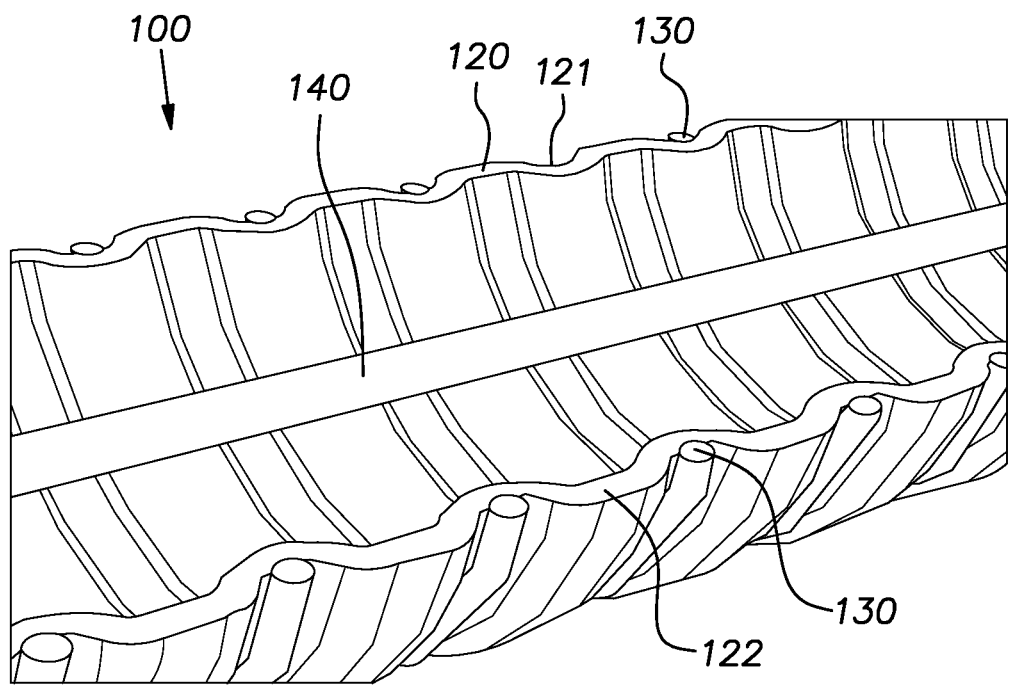
FIG. 4 is a detail perspective view of the filler pipe shown in FIG. 2, and wherein a cross section has been removed.

As illustrated particularly clearly in FIG. 4, it is preferred that the above discussed recess in the fuel pipe 120 is made up of folds in the hard plastic material constituting the fuel pipe 120 in question. Preferably, the wall of the fuel pipe 120 has a substantially constant thickness, and the recesses 121 and the ridges 122 are formed by the wall material, which in itself has constant thickness, being pleated, and where the metal coil 130 is arranged to run along such pleats. Such a construction, in addition to the above benefits, also gives that the filler pipe 100 will be very flexible without losing in resistance or axial compression resistance.

Namely, it is preferred that the filler pipe 100 is substantially rigid in its axial direction, in other words in its main longitudinal direction. By "substantially rigid" means that its length is only to a limited or negligible extent reduced as a result of a force acting in the axial direction, which force is applied as a result of the filling pipe 100 being pressed into and down into an ordinary tank pipe. For example, a pressure of about 100 N may be applied to the filler pipe 100 in the axial direction, which results in a maximum axial compression of the filler pipe 100 of 2%.

According to a preferred embodiment, the filler pipe 100 is arranged to be pushed, by means of said axially applied pressure, against a cap which opens inwards into the tank pipe and which is arranged at the orifice of the tank pipe, and can thereby open the cap so that the filler pipe through additional axial pressure can be brought past the opened cap and onwards down into the tank pipe. More specifically, this means that the filler pipe 100 has sufficiently high bending resistance, sufficiently low surface friction and sufficiently high axial compression resistance so that it, when it is pushed axially towards said openable cap, presses the cap inwards to an open position, is pressed inwards and past the cup, and into the tank pipe, and finally is pressed down into the tank pipe by bending so that it is shape-wise adapted to the inner shape of the tank pipe, which shape typically comprises a certain curvature. To push he fuel cap open, to an open position in which the filler pipe 100 can be pushed past the fuel cap, a force is required of in the order of 30-80 N, typically 50-70 N, why the filler pipe 100 is preferably so rigid that it can be subjected to such an axial stress of at least 30 N, preferably at least 50 N, from the location 101 and with support by the end 110, substantially without bending provided that it runs from the support 301, through the part 200 and up to the fuel cap.

It is preferred that the outer diameter of the filler pipe 100 is maximally 22 mm, preferably 15-22 mm.

Figure 5:
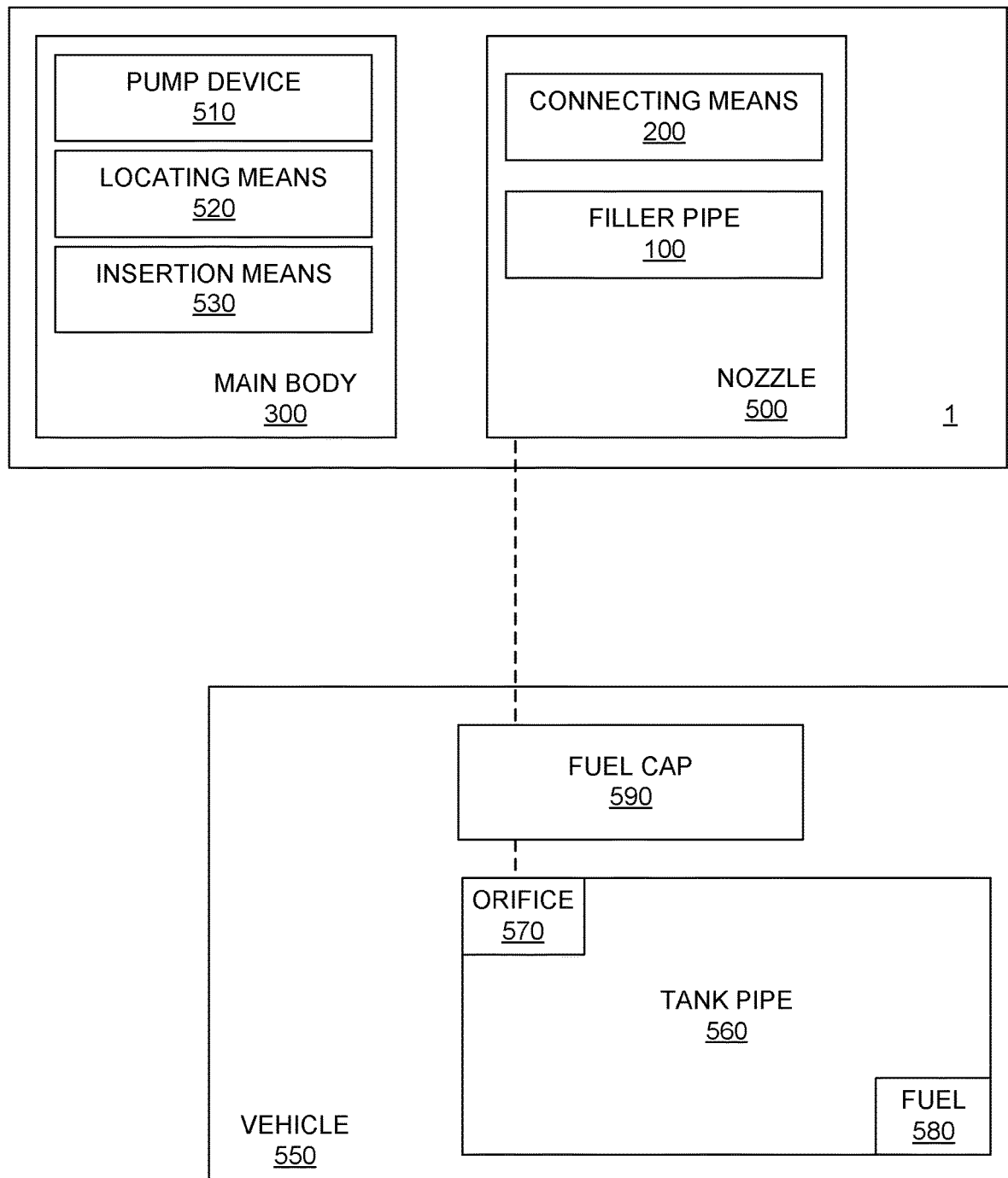
FIG. 5 is a component diagram of the device according to FIG. 1 and an associated vehicle.

FIG. 5 is a component diagram of the device according to FIG. 1 and an associated vehicle. Device 1 comprises a main body 300 and a nozzle 500. The main body 300 comprises a pump device 510, a locating means 520, and an insertion means 530. The nozzle 500 comprises a filler pipe 100 and a connecting means 200. The vehicle 550 comprises a fuel cap 590 and a tank pipe 560. The tank pipe 560 comprises an orifice 570. Tank pipe 560 may comprise a delivery of fuel 580.

Above, preferred embodiments have been described. However, it is apparent to the skilled person that many changes can be made to the described embodiments without departing from the basic idea of the invention.

For example, the above described device for positioning and pushing the filler pipe 100 up to and into the tank pipe may be designed in other ways, as long as the filler pipe 100 has the necessary properties as described herein.

Also, a combination of helical and annular metal wires may be used as the metal coil 130.

Thus, the invention is not to be limited to the described embodiments described, but may be varied within the scope of the enclosed claims.

What is claimed is:

1. A device for automatic refueling of a vehicle, the device comprising a main body and a nozzle,
   the nozzle arranged at the main body and comprising a connecting means and a flexible filler pipe that has an open end,
   the main body comprising a locating means, the locating means arranged to bring the connecting means of the nozzle to a position adjacent to an orifice of a tank pipe of the vehicle by bringing the main body towards the vehicle,
   the main body applying an axial pressure to the flexible filler pipe at a location spaced from the open end by means of further movement of the main body towards the tank pipe, such that the axial pressure inserts the flexible filler pipe against a force of a spring in the connecting means, whereby a bellows of the main body is axially compressed, the open end first, into the tank pipe, and deliver fuel through the open end of the flexible filler pipe into the tank pipe, the flexible filler pipe being between 15 and 100 cm long and comprising an inner fuel pipe comprising flexible hard plastic material through which the fuel is delivered into the tank pipe and an outer metal coil disposed in a helical recess in an outer surface of the inner fuel pipe extending along a length thereof.

2. The device according to claim 1, wherein the inner fuel pipe and the metal coil run along a common stretch of at least 15 cm along the flexible filler pipe.

3. The device according to claim 1, wherein the recess in the surface of the inner fuel pipe is spiral-shaped and is configured to arrange the outer metal coil in a spiral along the inner fuel pipe.

4. The device according to claim 1, wherein the recess in the surface of the inner fuel pipe is comprised by folds in the flexible hard plastic material of the inner fuel pipe.

5. The device according to claim 4, wherein an outer radius of the metal coil, and an outer radius of the inner fuel pipe, are substantially equal along a common stretch of at least 15 cm along the flexible filler pipe.

6. The device according to claim 1, wherein the flexible filler pipe is substantially rigid in its axial direction.

7. The device according to claim 1, wherein an outer diameter of the flexible filler pipe is 15-22 mm.

8. The device according to claim 1, wherein the flexible filler pipe is configured such that additional axial pressure pushes the flexible filler pipe towards an initially closed fuel cap of the vehicle, the fuel cap being arranged at the orifice of the tank pipe such that the fuel cap opens inwards towards the tank pipe as a result of the additional axial pressure, and the flexible filler pipe being inserted past the open fuel cap and into the tank pipe as a result of the additional axial pressure.

9. A method for automatic refueling of a vehicle using a device comprising a main body and a nozzle, the method comprising:

automatically positioning, by a locating means of the main body, a connection means of the nozzle in connection to an orifice of a tank pipe of the vehicle by bringing the main body towards the tank pipe, the nozzle comprising a flexible filler pipe, the flexible filler pipe being between 15 and 100 cm long and having (i) an inner fuel pipe of flexible hard plastic material configured to deliver fuel into the tank pipe, and (ii) an outer metal coil running in a helical recess extending along the surface of the fuel pipe;

moving, by the locating means, the main body further towards the vehicle such that an axial pressure is applied to the flexible filler pipe from the main body such that the flexible filler pipe is inserted through the orifice and down a distance into the tank pipe thereby shape-wise adapting the flexible filler pipe to an associated shape of the tank pipe, and allowing delivery of the fuel through an open end of the flexible filler pipe into the tank pipe; and delivering, through the open end of the flexible filler pipe, the fuel into the tank pipe.

10. A device for automatic refueling of a vehicle, the device comprising:

a main body comprising a locating means; and a nozzle arranged at the main body and comprising a connecting means and a flexible filler pipe that has an open end, the open end of the flexible filler pipe being enclosed within a flexible tube of the connecting means;

wherein the locating means is arranged to bring the connecting means of the nozzle to a position adjacent to an orifice of a tank pipe of the vehicle by bringing the main body towards the vehicle, and wherein the main body applies a pressure to the flexible filler pipe such that at least a portion of the open end of the flexible filler pipe is axially displaced out of the connecting means and inserted into the tank pipe, at least a portion of the flexible filler pipe is shape-wise adapted to an inner shape of the tank pipe.

11. The device according to claim 10, wherein the flexible filler pipe comprises a metal coil arranged in a spiral-shaped recess on an outer surface of the flexible filler pipe.

12. The device according to claim 11, wherein an outer radius of the metal coil and an outer radius of the flexible filler pipe are substantially equal along a common stretch of at least 15 cm along the flexible filler pipe.

13. The device according to claim 10, wherein the flexible filler pipe is substantially rigid in its axial direction.

14. The device according to claim 10, wherein an outer diameter of the flexible filler pipe is 15-22 mm.

15. The device according to claim 10, wherein the flexible filler pipe is configured such that additional axial pressure pushes the flexible filler pipe towards an initially closed fuel cap of the vehicle, the fuel cap being arranged at the orifice of the tank pipe such that the fuel cap opens inwards towards the tank pipe as a result of the additional axial pressure, and the flexible filler pipe being inserted past the open fuel cap and into the tank pipe as a result of the additional axial pressure.

* * * * *